United States Patent
Lian et al.

(10) Patent No.: US 10,831,574 B2
(45) Date of Patent: Nov. 10, 2020

(54) REMOTE PROCEDURE CALL METHOD FOR NETWORK DEVICE AND NETWORK DEVICE

(71) Applicant: Huawei Technologies Co., Ltd., Shenzhen (CN)

(72) Inventors: Shuo Lian, Shanghai (CN); Zhibiao Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 72 days.

(21) Appl. No.: 16/202,790

(22) Filed: Nov. 28, 2018

(65) Prior Publication Data

US 2019/0108079 A1 Apr. 11, 2019

Related U.S. Application Data

(63) Continuation of application No. PCT/CN2016/102622, filed on Oct. 19, 2016.

(30) Foreign Application Priority Data

May 28, 2016 (CN) .......................... 2016 1 0370774

(51) Int. Cl.
*G06F 9/54* (2006.01)
*H04L 29/06* (2006.01)
(Continued)

(52) U.S. Cl.
CPC .......... *G06F 9/547* (2013.01); *G06F 9/44505* (2013.01); *G06F 9/45533* (2013.01); *G06F 9/54* (2013.01); *H04L 67/40* (2013.01)

(58) Field of Classification Search
None
See application file for complete search history.

(56) References Cited

U.S. PATENT DOCUMENTS 5,682,534 A   10/1997  Kapoor et al.
6,604,140 B1*  8/2003  Beck ..................... G06F 9/5055
                                                        709/201

(Continued)

FOREIGN PATENT DOCUMENTS

CN       102007773 A     4/2011
CN       102103526 A     6/2011
(Continued)

OTHER PUBLICATIONS

Machine Translation and Abstract of Chinese Publication No. CN103810031, May 21, 2014, 19 pages.

(Continued)

*Primary Examiner* — Umut Onat
(74) *Attorney, Agent, or Firm* — Conley Rose, P.C.

(57) ABSTRACT

A remote procedure call (RPC) method for a network device and the network device, where a client sends an RPC request to an RPC core, where the RPC request requests to call a service deployed on a server, the RPC core receives the RPC request from the client and forwards the RPC request to the server when the RPC core determines that a dynamic service registry stores valid registration information of the server, the server receives the RPC request from the RPC core, and provides a corresponding service for the client according to the RPC request.

20 Claims, 11 Drawing Sheets

(51) Int. Cl.
*G06F 9/455* (2018.01)
*G06F 9/445* (2018.01)

(56) References Cited

U.S. PATENT DOCUMENTS

| | | | |
|---|---|---|---|
| 6,728,788 B1 | 4/2004 | Ainsworth et al. | |
| 7,496,637 B2* | 2/2009 | Han | G06F 16/958 709/217 |
| 2002/0143819 A1* | 10/2002 | Han | G06F 16/958 715/237 |
| 2008/0201736 A1 | 8/2008 | Gordon et al. | |
| 2008/0288960 A1 | 11/2008 | Eberlein et al. | |
| 2012/0042327 A1* | 2/2012 | Gokhale | G06F 9/52 719/330 |
| 2016/0088109 A1 | 3/2016 | Chen et al. | |

FOREIGN PATENT DOCUMENTS

| | | |
|---|---|---|
| CN | 103810031 A | 5/2014 |
| CN | 104598257 A | 5/2015 |

OTHER PUBLICATIONS

Foreign Communication From a Counterpart Application, PCT Application No. PCT/CN2016/102622, English Translation of International Search Report dated Mar. 1, 2017, 2 pages.
Foreign Communication From a Counterpart Application, PCT Application No. PCT/CN2016/102622, English Translation of Written Opinion dated Mar. 1, 2017, 5 pages.
Machine Translation and Abstract of Chinese Publication No. CN102103526, Jun. 22, 2011, 12 pages.
Foreign Communication From a Counterpart Application, Chinese Application No. 201610370774.2, Chinese Office Action dated Jun. 4, 2019, 6 pages.
Foreign Communication From a Counterpart Application, European Application No. 16903804.9, Extended European Search Report dated Apr. 11, 2019, 9 pages.

* cited by examiner

REMOTE PROCEDURE CALL METHOD FOR NETWORK DEVICE AND NETWORK DEVICE

CROSS-REFERENCE TO RELATED APPLICATIONS

This application is a continuation of International Patent Application No. PCT/CN2016/102622 filed on Oct. 19, 2016, which claims priority to Chinese Patent Application No. 201610370774.2 filed on May 28, 2016. The disclosures of the aforementioned applications are hereby incorporated by reference in their entireties.

TECHNICAL FIELD

The present application relates to the field of communications technologies, and in particular, to a remote procedure call (RPC) method for a network device and a network device.

BACKGROUND

A distributed memory database mainly includes two deployment scenarios for an RPC core, a standalone deployment scenario and an embedded deployment scenario. The embedded deployment scenario means that a client and a server are deployed on a same virtual machine (VM) on a network device, and the RPC core is responsible for performing communication among data nodes, processes, and threads in the processes.

In an embedded deployment scenario for an RPC core, referring to FIG. 1, when a client needs to call a service deployed on a server, the client needs to call a message transfer function in an operating system kernel using the RPC core in order to send a call request to a port on a network interface card (NIC), and queries a port that is corresponding to the server and that is on the NIC in order to send the call request sent by the client to the port corresponding to the server using the RPC core.

Each time the client calls the service of the server, the operating system kernel needs to be called. However, a communication delay and resource overheads increase because of frequent calls for the operating system kernel.

SUMMARY

Embodiments of the present application provide an RPC method for a network device and a network device in order to resolve a problem that in an existing embedded deployment scenario for an RPC core, a communication delay is high, and resource overheads are high because of frequent calls for an operating system kernel.

To achieve the foregoing objective, the following technical solutions are used in the embodiments of the present application.

According to a first aspect, an RPC method for a network device is provided. The network device includes at least one VM. An RPC core, a server, and a client run on the VM. The method includes sending, by the client, an RPC request to the RPC core, where the RPC request is used to request to call a service deployed on the server, receiving, by the RPC core, the RPC request sent by the client, forwarding, the RPC request to the server according to the valid registration information when a dynamic service registry stores valid registration information of the server, receiving, by the server, the RPC request sent by the RPC core, and providing a corresponding service for the client according to the RPC request.

According to a second aspect, a network device is provided. The network device includes a hardware layer, a VM monitor (VMM) that runs at the hardware layer, and at least one VM that runs on the VMM. The hardware layer includes a processor and a memory. An RPC core, a server, and a client run on the VM. The client is configured to send an RPC request to the RPC core, where the RPC request is used to request to call a service deployed on the server, the RPC core is configured to receive the RPC request sent by the client, forward the RPC request to the server according to the valid registration information when a dynamic service registry stores valid registration information of the server, and the server is configured to receive the RPC request sent by the RPC core, and provide a corresponding service for the client according to the RPC request.

In this way, on the network device, after the RPC core in the VM receives the RPC request sent by the client, and determines that the dynamic service registry stores the valid registration information of a server, the RPC core may directly forward the RPC request to the server according to the registration information of the server in the dynamic service registry in order to directly call a service deployed on the server, and an operating system kernel does not need to be called during the call process such that a problem in an existing embedded deployment scenario for an RPC core that a communication delay is high, and resource overheads are high because of frequent calls for the operating system kernel can be resolved.

With reference to the first aspect, in a first possible implementation manner of the first aspect, the method further includes sending, by the server, a first indication message to the RPC core, where the first indication message is used to instruct to set the valid registration information of the server in the dynamic service registry, receiving, by the RPC core, the first indication message sent by the server, and setting the valid registration information of the server in the dynamic service registry according to the first indication message.

With reference to the second aspect, in a first possible implementation manner of the second aspect, the server is further configured to send a first indication message to the RPC core, where the first indication message is used to instruct to set the valid registration information of the server in the dynamic service registry, and the RPC core is further configured to receive the first indication message sent by the server, and set the valid registration information of the server in the dynamic service registry according to the first indication message.

With reference to the first aspect or the first possible implementation manner of the first aspect, in a second possible implementation manner of the first aspect, the method further includes sending, by the server, a second indication message to the RPC core, where the second indication message is used to instruct to set the valid registration information of the server stored in the dynamic service registry to be invalid registration information, and receiving, by the RPC core, the second indication message sent by the server, and setting, according to the second indication message, the valid registration information of the server stored in the dynamic service registry to be invalid registration information.

With reference to the second aspect or the first possible implementation manner of the second aspect, in a second possible implementation manner of the second aspect, the server is further configured to send a second indication message to the RPC core, where the second indication message is used to instruct to set the valid registration information of the server stored in the dynamic service registry to be invalid registration information, and the RPC core is further configured to receive the second indication message sent by the server, and set, according to the second indication message, the valid registration information of the server stored in the dynamic service registry to be invalid registration information.

In this way, the RPC core may set the valid registration information or the invalid registration information of the server in the dynamic service registry according to an instruction of the server.

With reference to any one of the foregoing aspects, or the first to the second possible implementation manners of the aspects, in a third possible implementation manner of any of the foregoing aspects, the registration information of the server includes a correspondence between an identity of the server and a service handle.

With reference to any one of the first aspect, or the first to the third possible implementation manners of the first aspect, in a fourth possible implementation manner of the first aspect, the RPC request carries the identity of the server. That the RPC core determines that a dynamic service registry stores valid registration information of the server includes determining, by the RPC core, that the dynamic service registry stores the valid registration information of the server if the dynamic service registry stores valid registration information that is corresponding to the identity of the server that is carried in the RPC request. Forwarding, by the RPC core, the RPC request to the server according to the valid registration information includes determining, by the RPC core and in the valid registration information, a service handle that is corresponding to the identity of the server that is carried in the RPC request, and forwarding the RPC request to the server according to the service handle.

With reference to any one of the second aspect, or the first to the third possible implementation manners of the second aspect, in a fourth possible implementation manner of the second aspect, the RPC request carries the identity of the server. That the RPC core is configured to determine that a dynamic service registry stores valid registration information of the server includes determining that the dynamic service registry stores the valid registration information of the server if the dynamic service registry stores valid registration information that is corresponding to the identity of the server that is carried in the RPC request. That the RPC core is configured to forward the RPC request to the server according to the valid registration information includes determining, in the valid registration information, a service handle that is corresponding to the identity of the server that is carried in the RPC request, and forwarding the RPC request to the server according to the service handle.

In this way, that the dynamic service registry stores the valid registration information of the server may be determined in a simple and quick manner and according to the identity, and the RPC request may be directly and efficiently redirected to the server according to the service handle.

With reference to any one of the first aspect, or the first to the fourth possible implementation manners of the first aspect, in a fifth possible implementation manner of the first aspect, the method further includes sending, by the server, a response message to the RPC core, where the response message carries a service execution result such that the RPC core forwards the response message to the client, receiving, by the RPC core, the response message sent by the server, and forwarding the response message to the client, and receiving, by the client, the response message sent by the RPC core.

With reference to any one of the second aspect, or the first to the fourth possible implementation manners of the second aspect, in a fifth possible implementation manner of the second aspect, the server is further configured to send a response message to the RPC core, where the response message carries a service execution result such that the RPC core forwards the response message to the client, the RPC core is further configured to receive the response message sent by the server, and forward the response message to the client, and the client is further configured to receive the response message sent by the RPC core.

In this way, the server may forward the service execution result to the client using the RPC core, and does not need to use an operating system kernel.

According to a third aspect, a network device is provided, including a processor and a memory, where the memory is configured to store data and an instruction, and the processor is configured to execute the instruction to implement the method corresponding to the first aspect or any possible implementation manner of the first aspect.

According to a fourth aspect, a data center is provided, including the network device described in the second aspect or the third aspect.

BRIEF DESCRIPTION OF DRAWINGS

To describe the technical solutions in some of the embodiments of the present application more clearly, the following briefly describes the accompanying drawings describing some of the embodiments. The accompanying drawings in the following description show merely some embodiments of the present application.

DESCRIPTION OF EMBODIMENTS

The following describes the technical solutions in the embodiments of the present application with reference to the accompanying drawings in the embodiments of the present application. The described embodiments are merely some but not all of the embodiments of the present application.

For ease of understanding, some concepts related to the present application are described for reference, as shown below.

An RPC means that a process in a local system activates a process in a remote system.

A VM refers to a complete computer system that is formed by means of software simulation, has a complete hardware system function, and runs in a completely isolated environment.

A network device refers to a physical bearer device of a VM in a communications network.

A client refers to a program that requests to call a service provided by another program.

A server refers to a program that provides a service for another program.

A handle refers to a unique integer value, that is, a 4-byte (8-byte in a 64-bit program) value, which is used for identifying different objects in a client program or different instances in a same class, such as a window, a button, an icon, a scroll box, an output device, a control, or a file such that the client program can access information about a corresponding object using the handle.

Figure 2:
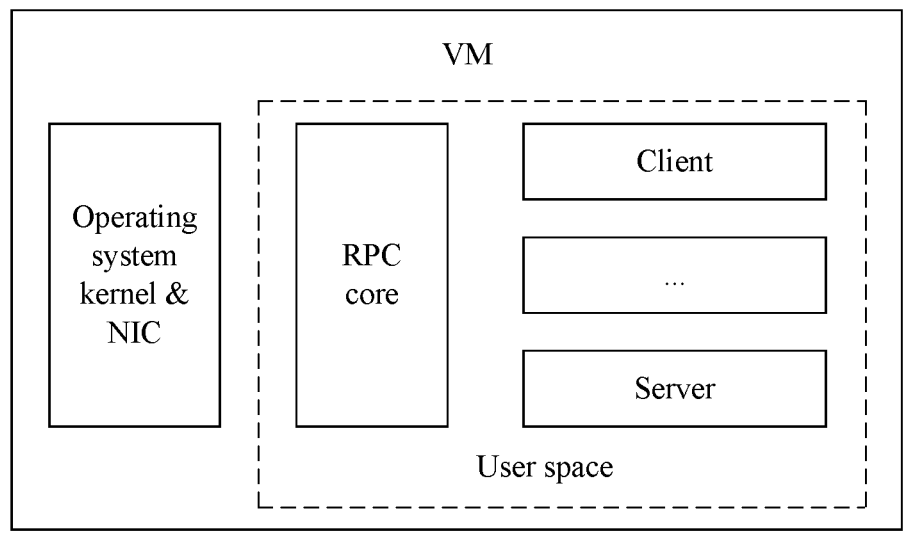
FIG. 2 is a schematic diagram of a user space range according to an embodiment of the present application.

A user space includes a server, a client, and an RPC core, and includes neither an operating system kernel nor an NIC. Further, for a schematic diagram of the user space, refer to FIG. 2.

A dynamic service registry is used to store registration information of a server, where whether the registration information is valid registration information or invalid registration information changes dynamically.

Figure 3:
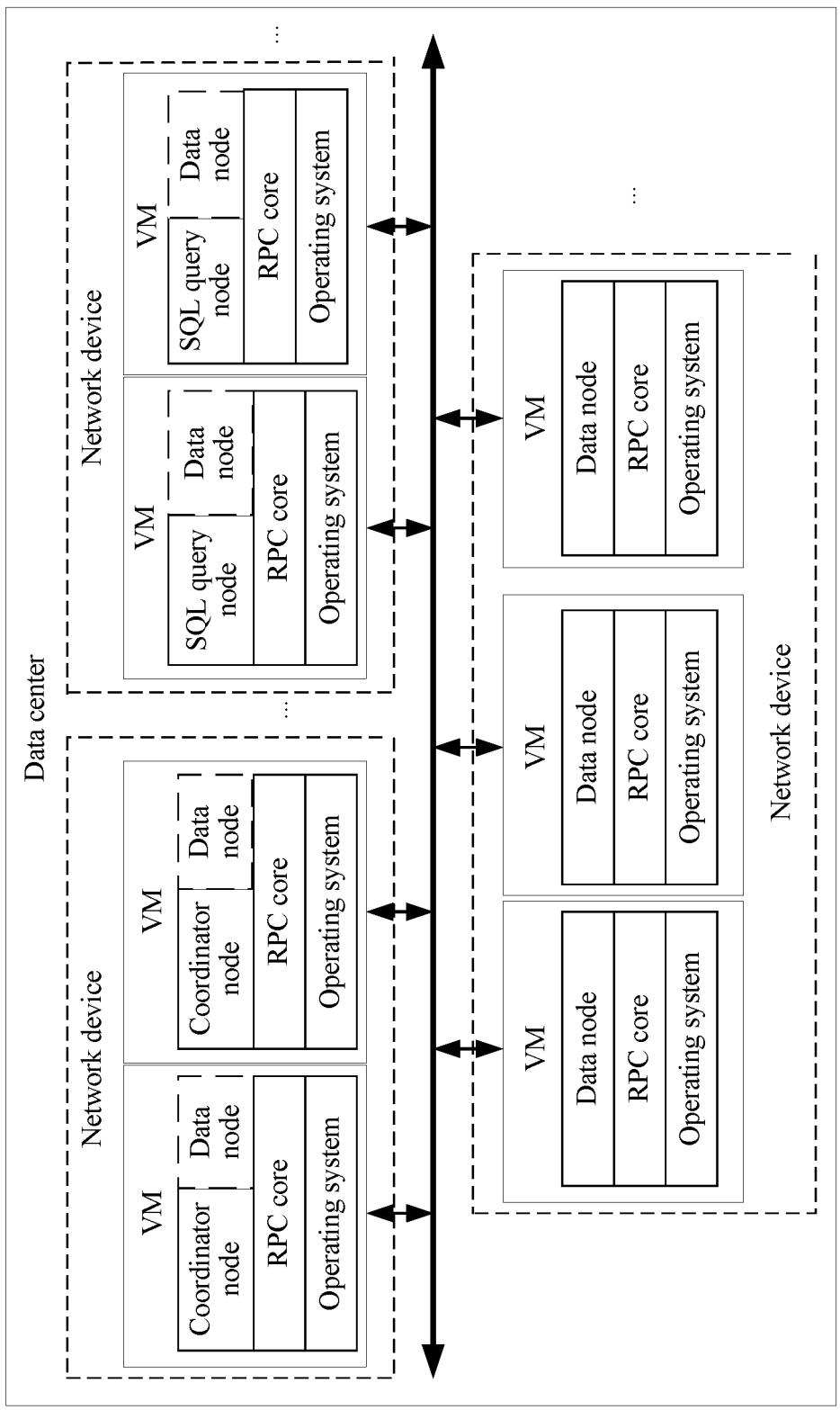
FIG. 3 is a schematic structural diagram of a data center according to an embodiment of the present application.

In a current distributed memory database, as shown in FIG. 3, a data center may include multiple VMs, and the VMs may be located on a network device. The network device herein is a physical machine, and network devices may be connected using a high-speed network. On a VM that runs an operating system (such as LINUX) in the data center, a data node, a coordinator node, a structured query language (SQL) query node, or the like may be deployed, and a client may be deployed.

An RPC core may be shared in one VM, and the RPC core is a component mainly responsible for performing communication between the VM and outside, or communication inside the VM. Further, for a basic architecture diagram of the RPC core, refer to FIG. 4. A customable RPC operation layer is mainly used to enable a user to flexibly customize encapsulation of an RPC operation. An RPC encapsulation layer includes an RPC encapsulation wrapper (also referred to as RPC Wrapper) and a dispatcher. The RPC encapsulation wrapper mainly completes basic encapsulation for a communications model of a communications core in order to facilitate use of a customable RPC operation layer. The dispatcher completes a function of monitoring data communication and dispatching RPC services. A transport layer completes abstraction for a transport layer of a system, and may help the system flexibly bind different communications protocols, such as the InifiniBand protocol, the transmission control protocol (TCP), and the user datagram protocol (UDP). A network module refers to abstraction description of network transmission at a kernel or a lower layer of the operating system. A service management layer completes dynamic service registration and management, and includes a dispatcher component and a worker queue component. A customable service layer is a component for flexibly describing and implementing a customable service.

Figure 5:
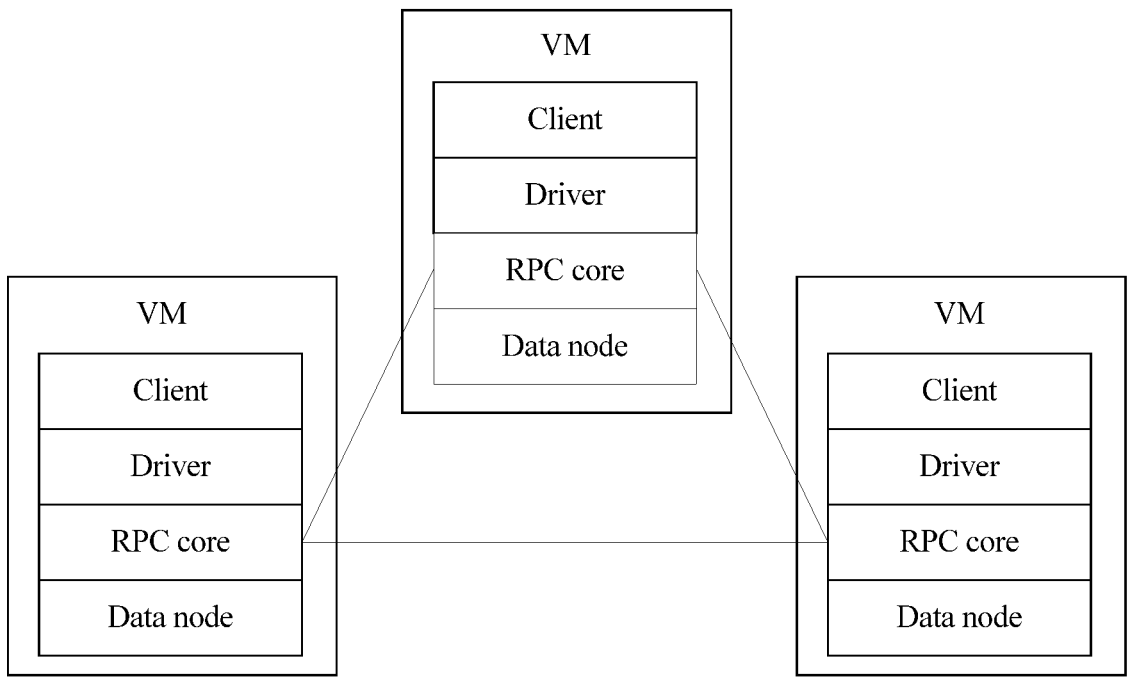
FIG. 5 is a schematic diagram of an embedded deployment scenario for an RPC core according to an embodiment of the present application.
Figure 6:
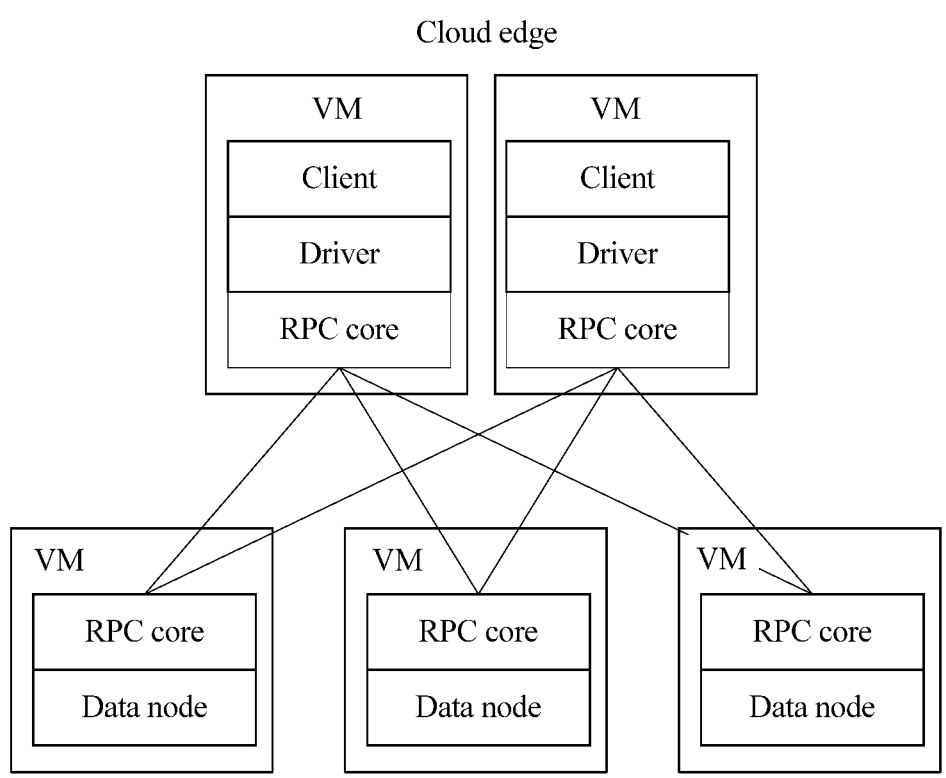
FIG. 6 is a schematic diagram of a standalone deployment scenario for an RPC core according to an embodiment of the present application.

Deployment statuses of an RPC core in a VM may include an embedded deployment scenario shown in FIG. 5 and a standalone deployment scenario shown in FIG. 6.

In the embedded deployment scenario shown in FIG. 5, a client and a server are deployed on a same VM, or in a same process. The RPC core is capable of performing communication between data nodes, between processes, and between threads in a process. A network operating system is a platform of a network Internet Protocol (IP) layer and an IP capability, includes IP layer control and IP layer forwarding, and supports separation between forwarding and control, and scheduling of network traffic. A client describes an application that uses a distributed data cluster. A driver is a driver interface component of a distributed memory data center. An RPC core is a component responsible for performing communication between a client and a memory data cluster and communication in a cluster. A data node is a data node in a distributed data cluster, and is generally a server configured to provide a service.

In the standalone deployment scenario shown in FIG. 6, a server is not included in a VM, and an RPC core is capable of performing communication between data nodes and between processes. A cloud edge is cloudification of a virtual node deployment service and is a most important battle field for network functions virtualization (NFV) and an anchor for an access network in the future. Cloudification of a wireless packet core network is the most urgent task. An APP describes a client that uses a distributed data cluster. A driver is a driver interface component of a distributed memory data center in an embedded scenario. The RPC core is a component responsible for completing communication between the client and the memory data cluster and communication in the cluster in the embedded scenario. A data node is a data node in the distributed data cluster in the embedded scenario, and is generally a server configured to provide a service.

In actual application, because the distributed data cluster is fault tolerable and has a fault recovery mechanism and a dynamic registration mechanism, when a fault occurs, an embedded deployment scenario may automatically convert to a standalone deployment scenario, or the standalone deployment scenario may switch to the embedded deployment scenario to meet a service requirement. The embedded deployment scenario and the standalone deployment scenario may be dynamically converted.

In an existing embedded deployment scenario, each time the client calls a service corresponding to a server, an operating system kernel needs to be called. However, a communication delay and resource overheads increase because of frequent calls for the operating system kernel. To resolve this problem, an embodiment of the present application provides a call method in an embedded deployment scenario for an RPC core such that a client can call a server in a same VM as the client without using an operating system kernel, that is, the client can directly call, using the RPC core, a service deployed on the server in a same VM as the client, thereby reducing a communication delay, and reducing resource overheads of the operating system kernel.

It should be noted that a client refers to a program that requests to call a service provided by another program, a server refers to a program that provides a service for another program, and a program may call a service provided by another program, or may provide a service for another program. Therefore, in this embodiment of the present application, a specific program may be a client in a case, or may be a server in another case.

The following describes in detail, using specific embodiments, a process in which a client directly calls, using an RPC core, a service deployed on a server in a same VM as the client, on a network device in an embedded deployment scenario for the RPC core.

Figure 7:
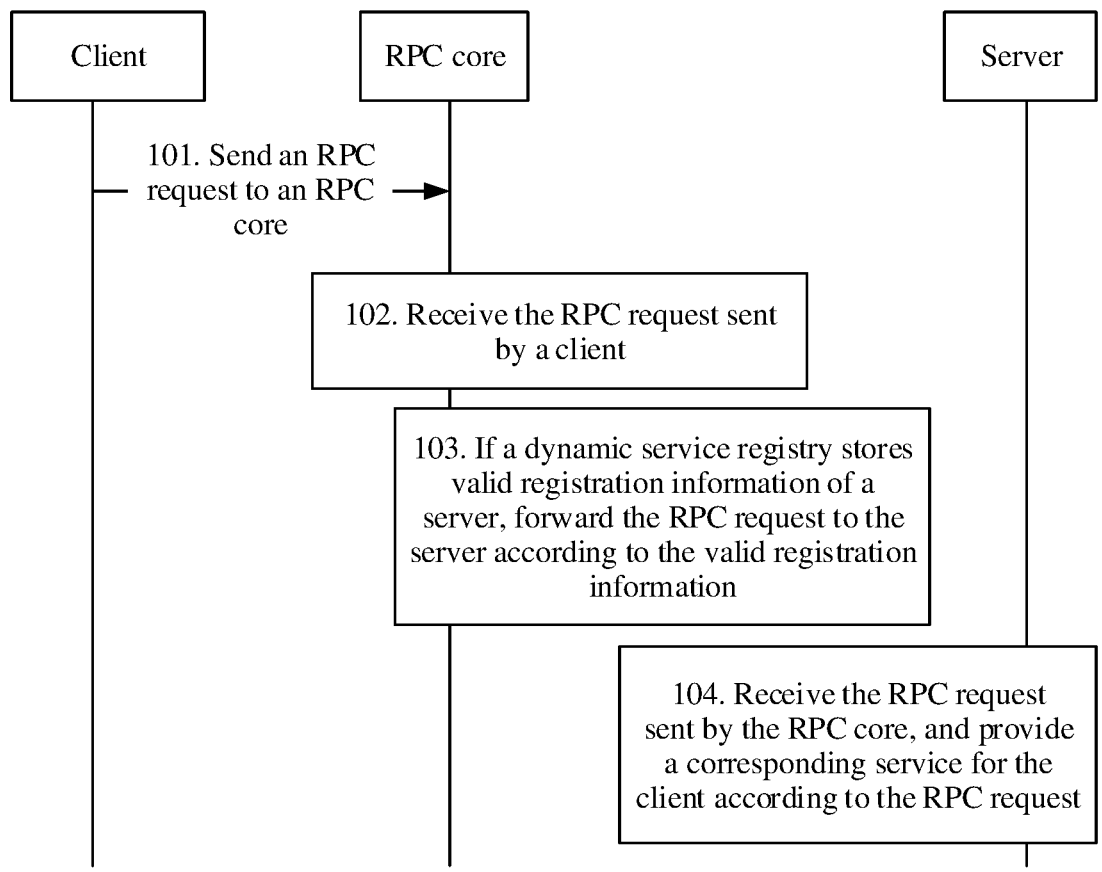
FIG. 7 is a flowchart of a call method according to an embodiment of the present application.

Referring to FIG. 7, an embodiment of the present application provides a RPC method for a network device. The network device includes at least one VM, and a RPC core, a server, and a client run on the VM. The method may include the following steps.

Step 101. The client sends an RPC request to the RPC core, where the RPC request is used to request to call a service deployed on the server.

When the client needs to call a service deployed on the server, the client sends the RPC request to the RPC core in order to request to call, using the RPC core, the service deployed on the server. The RPC request may carry an identity of the server in order to indicate the identity of a party that is called. In addition, the RPC request may carry an identity of the client in order to indicate an identity of a party that initiates the call, or may carry some related information.

Step 102. The RPC core receives the RPC request sent by the client.

Step 103. If a dynamic service registry stores valid registration information of the server, the RPC core forwards the RPC request to the server according to the valid registration information.

After receiving the RPC request sent by the client, the RPC core may determine whether the dynamic service registry stores the valid registration information of the server.

Because components in a same VM share one RPC core, only valid registration information of a server in a current VM can be stored in a dynamic service registry in the current VM, and valid registration information of a server in another VM cannot be stored in the dynamic service registry in the current VM.

Therefore, when the dynamic service registry stores the valid registration information of the server, it may be determined that the server and the client are currently in a same VM. The scenario is an embedded deployment scenario for an RPC core. In addition, the current moment is in a life cycle of the server, and the server may provide a corresponding service. Therefore, the RPC core may forward the RPC request to the server according to the valid registration information of the server in the dynamic service registry in order to call the service deployed on the server such that the call process may be limited to a user space shown in FIG. 2, and an operating system kernel does not need to be called when compared with other approaches, thereby accelerating the call process, reducing a communication delay, and reducing resource overheads of the operating system kernel.

Step 104. The server receives the RPC request sent by the RPC core, and provides a corresponding service for the client according to the RPC request.

When the RPC core forwards the RPC request to the server according to the valid registration information of the server in the dynamic service registry, the server receives the RPC request, and provides a requested service for the client according to the RPC request.

It may be learned that, in the RPC method for a network device that is provided in this embodiment of the present application, valid registration information of a server in a current VM is stored in a dynamic service registry using a dynamic registration mechanism, the valid registration information is provided for a client in the current VM using the dynamic service registry, and an RPC request sent by the client is redirected, according to the valid registration information, to the server using a redirection mechanism in order to call the server and a corresponding service.

In the RPC method for a network device that is provided in this embodiment of the present application, the network device includes at least one VM. After an RPC core in the VM receives an RPC request sent by a client, and determines that a dynamic service registry stores valid registration information of a server, the RPC core directly forwards the RPC request to the server according to the registration information of the server in the dynamic service registry in order to directly call a service deployed on the server. Therefore, the call process is limited to be within a range of a user space, and an operating system kernel does not need to be called during the call process. Therefore, a problem that in an existing embedded deployment scenario for a RPC core, a communication delay is high, and resource overheads are high because of frequent calls for the operating system kernel can be resolved.

The registration information of the server may include a correspondence between an identity of the server and a service handle. The identity is used to uniquely identify a server, for example, the identity may be a character string, and a specific form of the identity is not limited. The service handle is used when the service provided by the server is called.

Optionally, the RPC request may carry an identity of the server. In step 103, that the RPC core determines that a dynamic service registry stores valid registration information of the server may include that if the dynamic service registry stores the valid registration information that is corresponding to the identity of the server that is carried in the RPC request, determining, by the RPC core, that the dynamic service registry stores the valid registration information of the server. The valid registration information that is corresponding to the identity of the server that is carried in the RPC request refers to valid registration information that includes the identity of the server that is carried in the RPC request.

That the RPC core forwards the RPC request to the server according to the valid registration information may include determining, by the RPC core and in the valid registration information, a service handle that is corresponding to the identity of the server that is carried in the RPC request, and forwarding the RPC request to the server according to the service handle.

Further, the client may carry an identity of the called server, for example, an identity 1 in the RPC request such that the RPC core may determine, according to the identity 1, whether valid registration information that includes the identity 1 is included in the dynamic service registry. When the valid registration information that includes the identity 1 is included, a service handle corresponding to the identity 1 is also included in the dynamic service registry. The service handle is a service handle deployed on the server. Further, the RPC core may redirect the RPC request to the server according to the service handle, and directly call, using the service handle, the service deployed on the server.

In this way, the RPC core may determine, in a simple and quick manner and according to the identity, that the dynamic service registry stores the valid registration information of the server, and may directly and efficiently redirect the RPC request to the server according to the service handle.

Figure 8A:
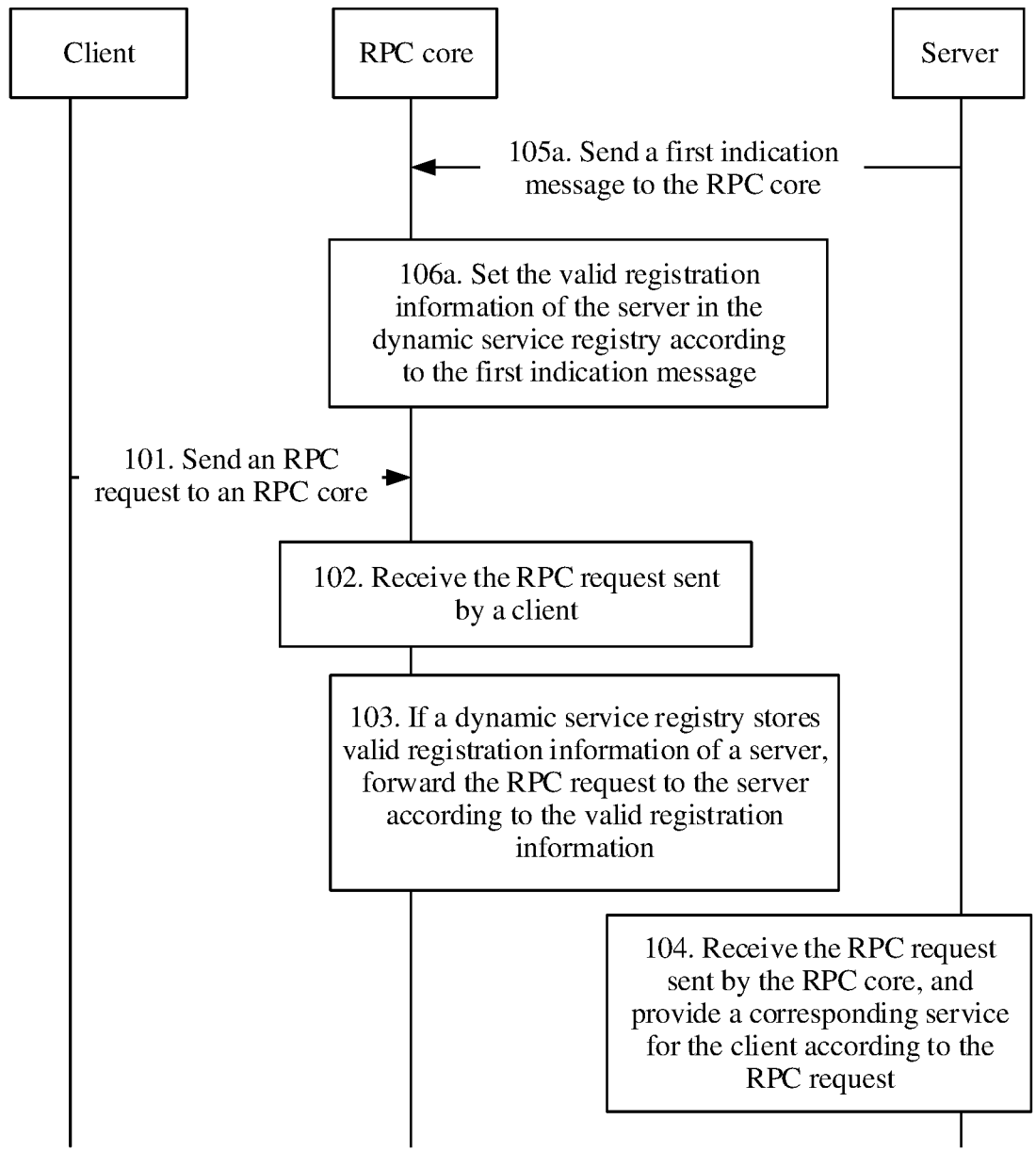
FIG. 8A is a flowchart of another call method according to an embodiment of the present application.

Referring to FIG. 8A, based on steps 101 to 104, the method may further include the following steps.

Step 105a. The server sends a first indication message to the RPC core, where the first indication message is used to instruct to set the valid registration information of the server in the dynamic service registry.

Step 106a. The RPC core sets the valid registration information of the server in the dynamic service registry according to the first indication message.

It should be noted that, that steps 105a to 106a are performed before step 101 in FIG. 8A is merely for an illustration purpose, and there is no specific sequence between steps 105a to 106a and steps 101 to 104.

Figure 8B:
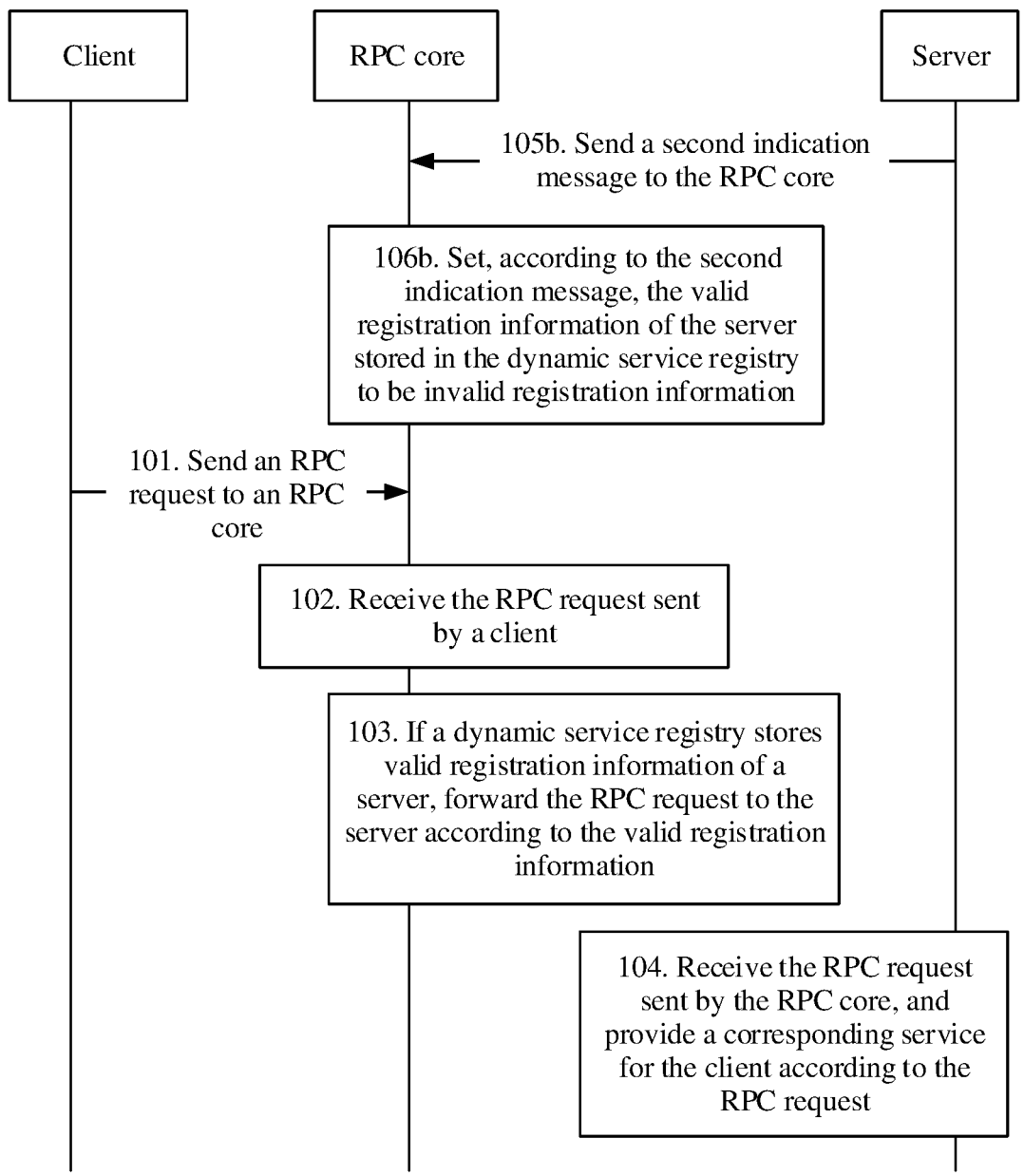
FIG. 8B is a flowchart of another call method according to an embodiment of the present application.

Further, based on the steps in the method shown in FIG. 7 or FIG. 8A, the method may further include the following steps in FIG. 8B.

Step 105b. The server sends a second indication message to the RPC core, where the second indication message is used to instruct to set the valid registration information of the server stored in the dynamic service registry to be invalid registration information.

Step 106b. The RPC core sets, according to the second indication message, the valid registration information of the server stored in the dynamic service registry to be invalid registration information.

Figure 4:
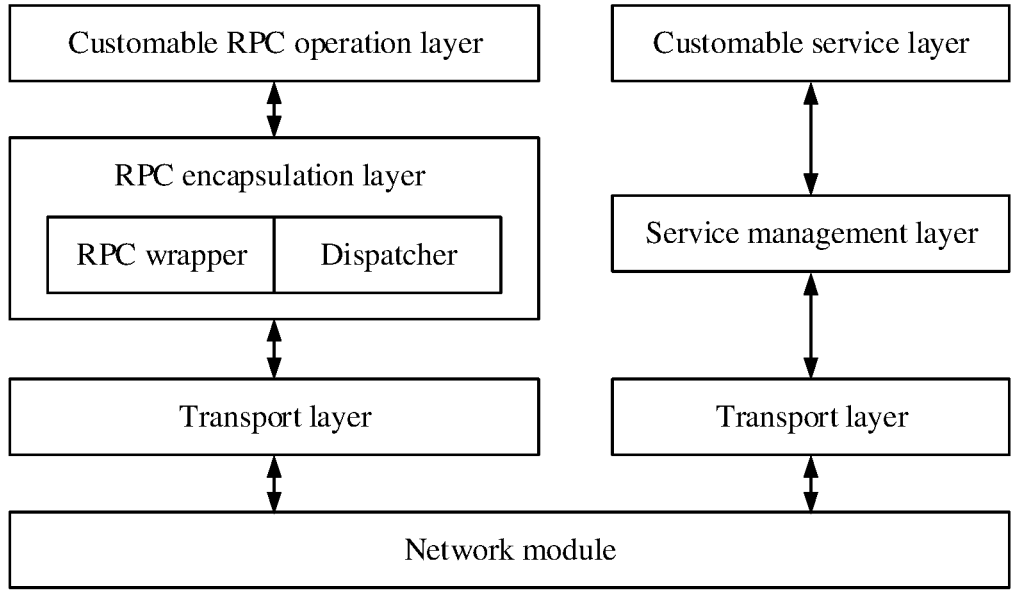
FIG. 4 is a basic architecture diagram of an RPC core according to an embodiment of the present application.

For example, in FIG. 8B, steps 105b to 106b are added based on the steps shown in FIG. 4. That steps 105b to 106b are performed before step 101 is merely for an illustration purpose, and there is no specific sequence between steps 105b to 106b and steps 101 to 104.

In addition, steps 105b to 106b may be further added after steps 105a to 106a shown in FIG. 8A.

Figure 9:
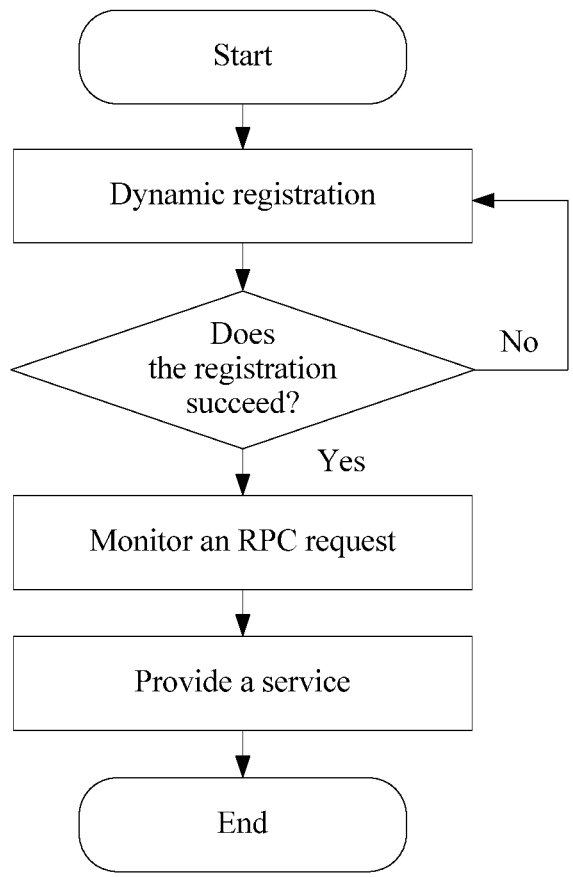
FIG. 9 is a flowchart of an execution method of a server according to an embodiment of the present application.

Generally, when the server is being initialized, the server may send the first indication message to the RPC core. The first indication message may be a dynamic registration request that is used to instruct the RPC core to set the valid registration information of the server in the dynamic service registry in order to perform dynamic registration in the RPC core. If the dynamic registration fails, the server may resend the first indication message, and continue to perform the dynamic registration, or if the dynamic registration succeeds, whether the RPC request is received may be monitored such that a corresponding service may be provided after the RPC request is received. Further, FIG. 9 shows the implementation procedure corresponding to the server, refer to.

When the server needs to exit because a fault occurs or for another reason, the second indication message may be sent to the RPC core in order to instruct the RPC core to set the valid registration information of the server stored in the dynamic service registry to be invalid registration information such that dynamic unregistration is performed in the RPC core. A time period between sending the first indication message and the second indication message by the server to the RPC core is corresponding to a life cycle of the server. In the life cycle, the server may provide a corresponding service.

Further, the RPC core may receive the first indication message from the server, may receive the second indication message from the server, or may receive the second indication message from the server after receiving the first indication message from the server. This is not limited herein.

Optionally, that the RPC core sets the valid registration information of the server in the dynamic service registry may include the following.

Case 1: If the dynamic service registry does not store the registration information of the server, the RPC core writes the registration information of the server to the dynamic service registry, where the registration information is the valid registration information.

Case 2: If the dynamic service registry stores the registration information of the server, and the registration information is invalid registration information, the RPC core updates the registration information, where the updated registration information is the valid registration information.

The registration information may include an identifier. When the identifier is a first status value, the registration information is valid registration information, or when the identifier is a second status value, the registration information is invalid registration information. Therefore, in case 1, after writing the registration information of the server to the dynamic service registry, the RPC core may set the identifier in the registration information to a first status value. In case 2, if the dynamic service registry stores the registration information of the server, and the registration information is invalid registration information, the identifier in the registration information is a second status value, and after updating the registration information, the RPC core may switch the identifier in the registration information from the second status value to the first status value.

Optionally, that the RPC core sets the valid registration information of the server stored in the dynamic service registry to be invalid registration information may include deleting, by the RPC core, the valid registration information of the server.

In addition, when the registration information includes an identifier, that the RPC core sets the valid registration information of the server stored in the dynamic service registry to be invalid registration information may include switching, by the RPC core, the identifier from the first status value to the second status value.

It may be learned that if an indication message that is last received by the RPC core from the server is a first indication message, the dynamic service registry stores the valid registration information of the server, and the server is in a life cycle, or if the indication message that is last received by the RPC core from the server is a second indication message, the dynamic service registry does not store the valid registration information of the server, and the server is not in the life cycle.

Figure 10:
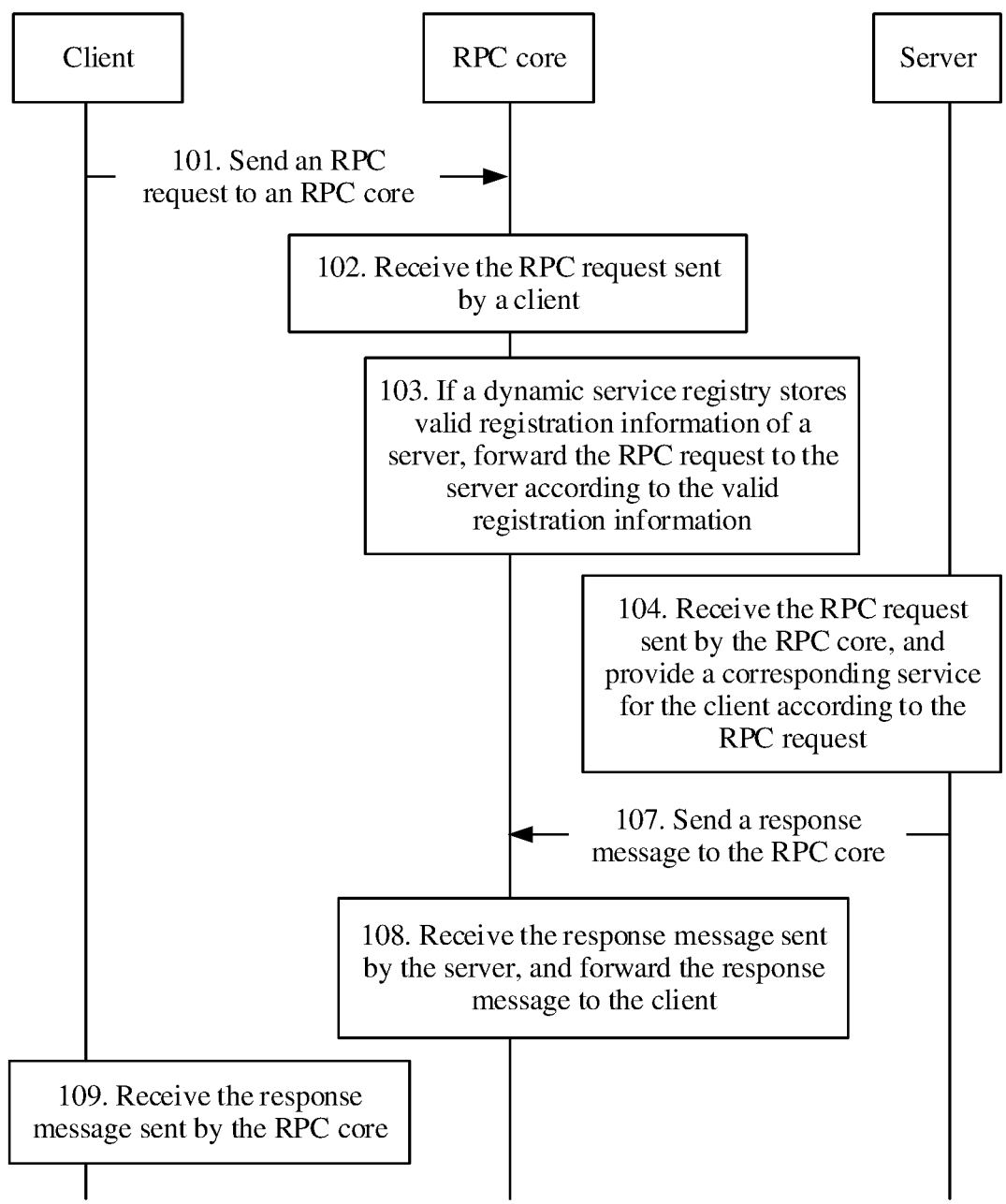
FIG. 10 is a flowchart of another call method according to an embodiment of the present application.

In addition, referring to FIG. 10, after the server provides a corresponding service in step 104, when an execution result needs to be returned, the method may further include the following steps.

Step 107. The server sends a response message to the RPC core, where the response message carries a service execution result such that the RPC core forwards the response message to the client.

Step 108. The RPC core receives the response message sent by the server, and forwards the response message to the client.

Step 109. The client receives the response message sent by the RPC core.

In this way, the server may forward the service execution result to the client using the RPC core, and does not need to use an operating system kernel.

In addition, after step 103, if the RPC core determines that the dynamic service registry does not store the valid registration information of the server, the server may be not in a current VM, and a current scenario may be not an embedded deployment scenario for an RPC core. In this case, the RPC core may call the operating system kernel using a call method in the other approaches. A communications port of a server is determined using a core transport layer, and a service deployed on the server is called using an NIC and the determined communications port. This is the same as a call process in the other approaches, and details are not described herein.

In addition, there is another call manner in the embedded deployment scenario for an RPC core, that is, a server predefines interfaces one by one between the service and the client, and the client calls services deployed on the server according to the predefined interfaces provided by the server. In this method, because an operating system kernel does not need to be called, the call process may be accelerated and a communication delay may be reduced. However, in this method, the client and the server need to be sensed by each other using the predefined interfaces, thereby increasing a coupling degree. In addition, the method is merely applicable to a static situation, and is not applicable to a dynamically changing scenario. When a location of the client or the server changes, or when the server performs service upgrade, interfaces between the client and the server changes, and the call process cannot be accurately executed according to the originally predefined interfaces.

It should be emphasized that, in the RPC method for a network device that is provided in this embodiment of the present application, valid registration information of a server is stored in a dynamic service registry using a dynamic registration mechanism, the valid registration information is dynamically provided for a client using the dynamic service registry, and an RPC request sent by the client is redirected using a redirection mechanism such that the server and a corresponding service are directly called according to a service handle of the server. Therefore, in an entire acceleration process, there is no sensation performed between the client and the server such that decoupling between the client and a server communications layer is satisfied. In addition, whether the location of the client or the server changes or whether the service upgrade is performed on the server does not affect use of the method. After the service upgrade is performed on the server or the location of the server changes, dynamic registration may be performed in a dynamic service registry in a current VM in which the server is located, registration information in the dynamic service registry is corresponding, in real time, to service information deployed on the server. When the location of the client changes, the client may determine whether the valid registration information of the server is included in the dynamic service registry in the current VM in order to determine whether the client is in a same VM as the server, and whether the server is in a life cycle, if the client is in a same VM as the server, and the server is in a life cycle, the service deployed on the server may be called using the service handle in the valid registration information.

Generally, the standalone deployment scenario and the embedded deployment scenario usually may be converted dynamically, that is, the VM in which the client or the server is located usually changes dynamically as time goes by, and as services are expanded and demands increase, the server needs to be frequently upgraded. It may be learned that the call method provided in this embodiment of the present application is more suitable for an actual dynamically changing scenario such that services may be changed flexibly, a deployment cost may be reduced, and reliability may be improved, and therefore the method is more applicable.

In addition, in this embodiment of the present application, the server is configured to provide a corresponding service. Based on this embodiment of the present application, persons of ordinary skill in the art can easily figure out, without creative efforts, replacing the server with a buffer to store shared data. The client calls the buffer using the foregoing call method in order to obtain or access the data stored in the buffer. In this case, a call process may also be accelerated, a communication delay may also be reduced, and resource overheads may also be reduced using the foregoing call method provided in this embodiment of the present application.

Figure 11:
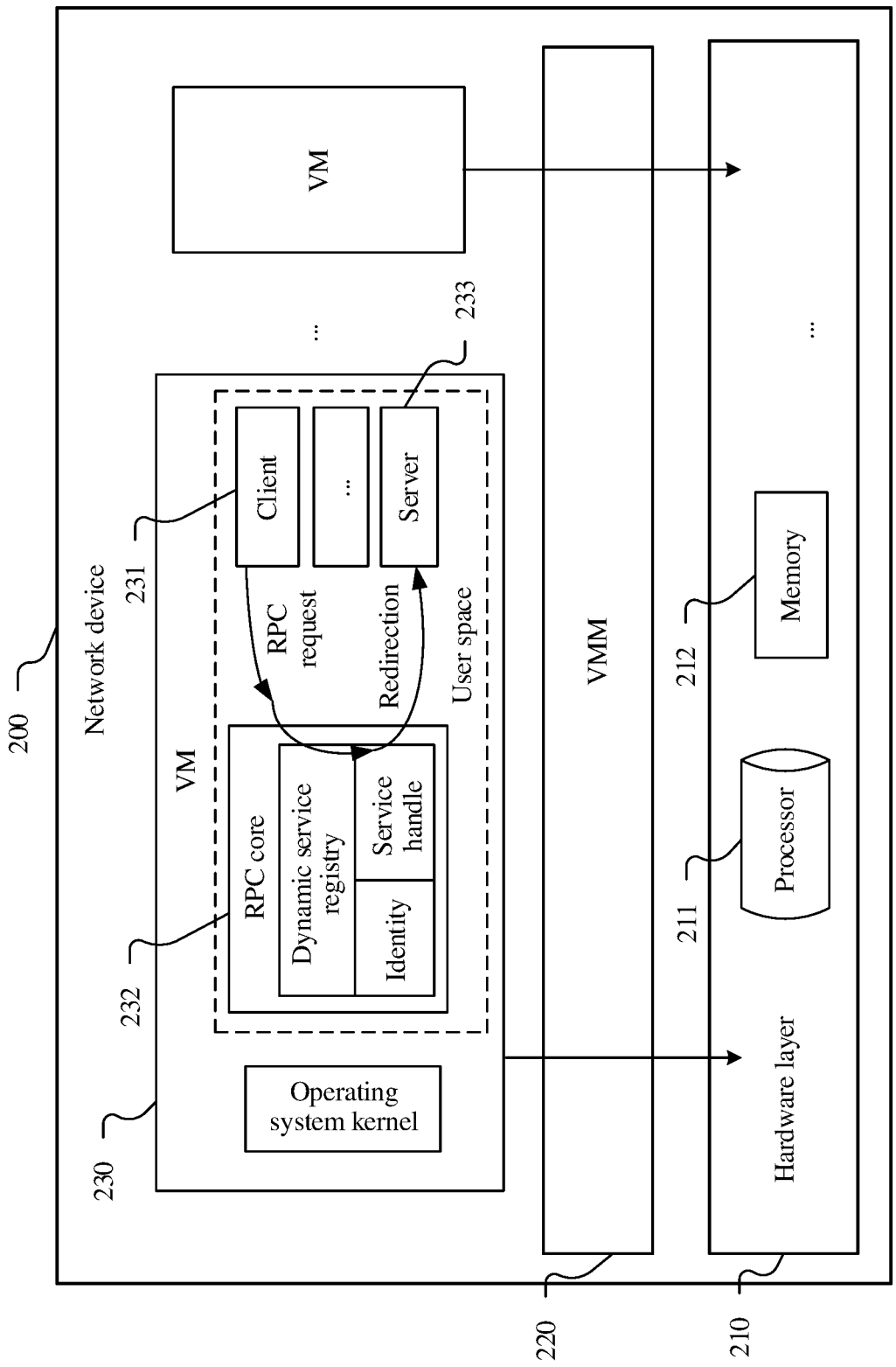
FIG. 11 is a schematic structural diagram of a network device according to an embodiment of the present application.

Another embodiment of the present application provides a network device 200. Referring to FIG. 11, the network device 200 may include a hardware layer 210, a VMM 220 that runs at the hardware layer 210, and at least one VM 230 that runs on the VMM 220. The hardware layer 210 includes hardware such as a processor 211 and a memory 212. An RPC core 232, a server 233, and a client 231 run on the VM 230. It may be understood that the RPC core 232, the server 233, and the client 231 may run on a same VM, or may run on two or three different VMs. This is not limited in this embodiment of the present application. The VMM 220 is configured to shield a hardware difference for a computer platform, and provide a user with multiple abstract, unified, and simulated computing environments, that is, multiple VMs 230. The VMM 220 simulates a virtual hardware environment that is independent of real physical hardware for each VM 230. The VM 230 calls hardware resources at the hardware layer 210 using the VMM 220, such as the processor 211 and the memory 212.

The memory 212 may include a volatile memory, for example, a random-access memory (RAM), the memory 212 may include a non-volatile memory, for example, a flash memory, a hard disk drive (HDD), or a solid state drive (SSD), or the memory 212 may include a combination of the foregoing types of memories.

The processor 211 may be a central processing unit (CPU), a network processor (NP), or a combination of the CPU and the NP.

The processor 211 may further include a hardware chip. The hardware chip may be an application-specific integrated circuit (ASIC), a programmable logic device (PLD), or a combination of the client-specific integrated circuit and the PLD. The PLD may be a complex programmable logic device (CPLD), a field programmable gate array (FPGA), a generic array logic (GAL), or any combination of the CPLD, the FPGA, or the GAL.

Further, in the VM 230 on the network device 200, the client 231 may be configured to send an RPC request to the RPC core 232, where the RPC request is used to request to call a service deployed on the server 233.

The RPC core 232 may be configured to receive the RPC request sent by the client 231, and when a dynamic service registry stores valid registration information of the server 233, forward the RPC request to the server 233 according to the valid registration information.

The server 233 may be configured to receive the RPC request sent by the RPC core 232, and provide a corresponding service for the client 231 according to the RPC request.

In addition, the server 233 may be further configured to send a first indication message to the RPC core 232, where the first indication message is used to instruct to set the valid registration information of the server 233 in the dynamic service registry. The RPC core 232 is further configured to set the valid registration information of the server 233 in the dynamic service registry according to the first indication message.

Optionally, that the RPC core 232 is configured to set the valid registration information of the server 233 in the dynamic service registry may include, if the dynamic service registry does not store the registration information of the server 233, writing the registration information of the server 233 to the dynamic service registry, where the registration information is the valid registration information, or if the dynamic service registry stores the registration information of the server 233, and the registration information is invalid registration information, updating the registration information, where the updated registration information is the valid registration information.

Alternatively, the server 233 may be further configured to send a second indication message to the RPC core 232, where the second indication message is instruct to set the valid registration information of the server 233 stored in the dynamic service registry to be invalid registration information. The RPC core 232 is further configured to set, according to the second indication message, the valid registration information of the server 233 stored in the dynamic service registry to be invalid registration information.

Optionally, that the RPC core 232 is configured to set the valid registration information of the server 233 stored in the dynamic service registry to be invalid registration information may include deleting the valid registration information of the server 233.

Alternatively, optionally, the registration information may include an identifier. When the identifier is a first status value, the registration information is valid registration information, or when the identifier is a second status value, the registration information is invalid registration information. That the RPC core 232 is configured to set the valid registration information of the server 233 stored in the dynamic service registry to be invalid registration information may include switching the identifier from the first status value to the second status value.

Further, the registration information of the server 233 may include a correspondence between an identity of the server 233 and a service handle. The RPC request carries the identity of the server 233.

That the RPC core 232 is configured to determine that a dynamic service registry stores valid registration information of the server 233 may include, if the dynamic service registry stores valid registration information that is corresponding to the identity of the server 233 that is carried in the RPC request, determining that the dynamic service registry stores the valid registration information of the server 233.

That the RPC core 232 is configured to forward the RPC request to the server 233 according to the valid registration information may include determining, in the valid registration information, a service handle that is corresponding to the identity of the server 233 that is carried in the RPC request, and forwarding the RPC request to the server 233 according to the service handle.

Still further, the server 233 may be further configured to send a response message to the RPC core 232, where the response message carries a service execution result such that the RPC core 232 forwards the response message to the client 231.

The RPC core 232 may be further configured to receive the response message sent by the server 233, and forward the response message to the client 231.

The client 231 is further configured to receive the response message sent by the RPC core 232.

It should be noted that for detailed working processes of the RPC core, the client 231, and the server 233, refer to related descriptions in the embodiments shown in FIG. 3 to FIG. 10, and details are not described again. According to the network device provided in this embodiment of the present application, after an RPC core in a VM receives an RPC request sent by a client, and determines that a dynamic service registry stores valid registration information of a server, the RPC core directly forwards the RPC request to the server according to the registration information of the server in the dynamic service registry in order to directly call a service deployed on the server. Therefore, the call process is limited to be within a range of a user space, and an operating system kernel does not need to be called during the call process. Therefore, a problem that in an existing embedded deployment scenario for an RPC core, a communication delay is high, and resource overheads are high because of frequent calls for the operating system kernel can be resolved.

Figure 1:
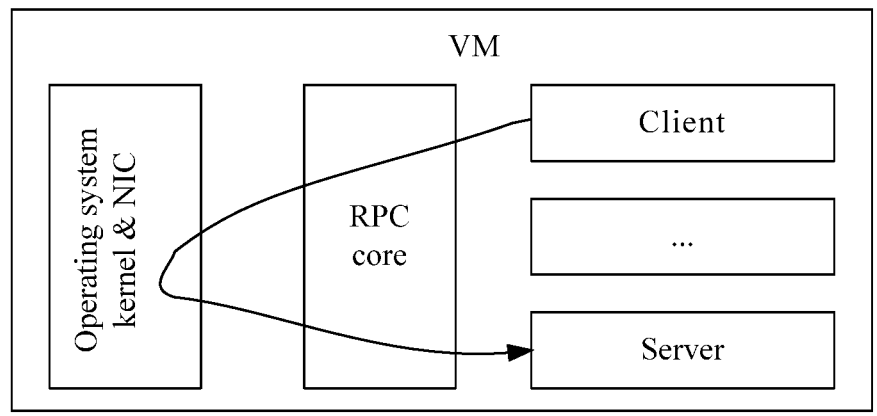
FIG. 1 is a schematic diagram of an RPC in an embedded deployment scenario for an RPC core.

Further, based on this embodiment of the present application, persons of ordinary skill in the art can easily figure out, without creative efforts, applying the RPC method applied to a VM, in any network device that has an RPC shown in FIG. 1, such as a smart watch, a pair of smart glasses, a game server, and a WI-FI node.

Figure 12:
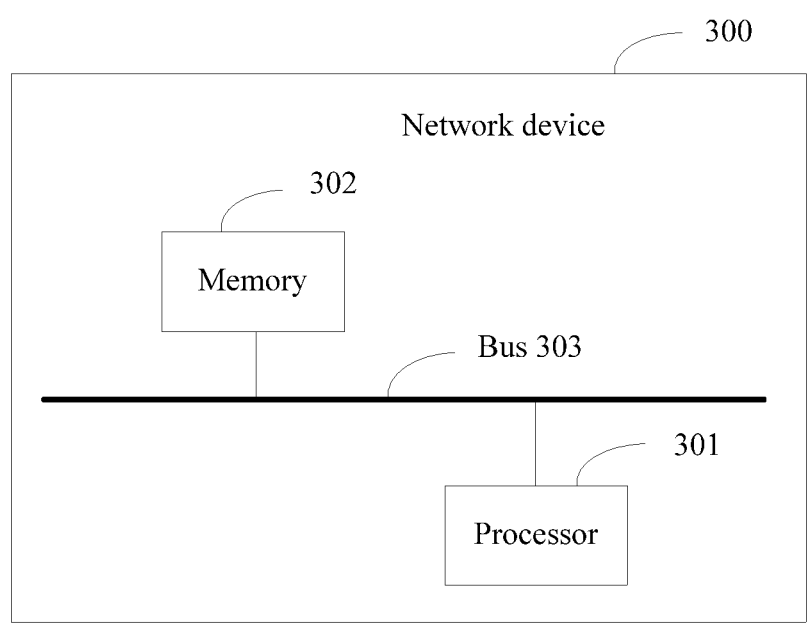
FIG. 12 is a schematic structural diagram of another network device according to an embodiment of the present application.

Therefore, another embodiment of the present application further provides a network device 300. The network device 300 may be a network device that does not include a VM, such as a smart watch, a pair of smart glasses, a game server, and a WI-FI node. Referring to FIG. 12, the network device 300 may include a processor 301 and a memory 302, where the processor 301 and the memory 302 are connected using a bus 303. The memory 302 is configured to store data and an instruction. The processor 301 is configured to execute the instruction stored in the memory 302 in order to perform functions of the client, the RPC core, and the server in the method procedure shown in FIG. 7, FIG. 8A, FIG. 8B, or FIG. 10 such that an RPC is implemented.

Further, the processor 301 may execute the foregoing instruction so as to perform the following operations of controlling the client to send an RPC request to the RPC core, where the RPC request is used to request to call a service deployed on a server, controlling the RPC core to receive the RPC request sent by the client, controlling, the RPC core to forward the RPC request to the server according to the valid registration information when the RPC core determines that a dynamic service registry stores valid registration information of the server, and controlling the server to receive the RPC request sent by the RPC core, and provide a corresponding service for the client according to the RPC request.

According to the network device provided in this embodiment of the present application, a processor executes an instruction to control an RPC core to, after receiving an RPC request sent by a client, and determining that a dynamic service registry stores valid registration information of a server, directly forward the RPC request to the server according to the registration information of the server in the dynamic service registry in order to directly call a service deployed on the server. Therefore, the call process is limited to be within a range of a user space, and an operating system kernel does not need to be called during the call process. Therefore, a problem that in an existing embedded deployment scenario for an RPC core, a communication delay is high, and resource overheads are high because of frequent calls for the operating system kernel can be resolved.

Another embodiment of the present application provides a data center. The data center may include a network device that includes a VM and that is shown in FIG. 11 or FIG. 12. For a specific structure of the data center, refer to the schematic structural diagram shown in FIG. 3.

In the several embodiments provided in this application, it should be understood that the disclosed network device, data center, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present application may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) to perform some of the steps of the methods described in the embodiments of the present application. The foregoing storage medium includes any medium that can store program code, such as a universal serial bus (USB) flash drive, a removable hard disk, a read-only memory (ROM), a RAM, a magnetic disk, or an optical disc.

Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A remote procedure call (RPC) method implemented by a network device, wherein the RPC method comprises:
    receiving, by an RPC core, an RPC request from client software, wherein the RPC request requests the RPC core to call a service deployed on a server, and wherein the network device comprises a virtual machine (VM), the RPC core, the server, and the client software;
    determining, by the RPC core, that a dynamic service registry stores valid registration information of the server, wherein the valid registration information comprises an identifier of a first status value, wherein invalid registration information comprises the identifier of a second status value, and wherein setting the valid registration information to be the invalid registration information comprises switching the identifier from the first status value to the second status value;
    forwarding, by the RPC core, the RPC request to the server according to the valid registration information when determining the dynamic service registry stores the valid registration information of the server;
    receiving, by the server, the RPC request from the RPC core; and
    providing, by the server, a corresponding service for the client software according to the RPC request.

2. The RPC method of claim 1, further comprising:
    sending, by the server, a first indication message to the RPC core, wherein the first indication message instructs the RPC core to set the valid registration information of the server in the dynamic service registry; and
    setting, by the RPC core, the valid registration information of the server in the dynamic service registry according to the first indication message.

3. The RPC method of claim 2, wherein setting the valid registration information of the server in the dynamic service registry comprises:
    writing, by the RPC core, registration information of the server to the dynamic service registry when the dynamic service registry does not store the registration information of the server, wherein the registration information is the valid registration information; and
    updating, by the RPC core, the registration information when the dynamic service registry stores the registration information of the server and the registration information is invalid registration information, wherein the updated registration information is the valid registration information.

4. The RPC method of claim 1, further comprising:
    sending, by the server, a second indication message to the RPC core, wherein the second indication message instructs the RPC core to set the valid registration information of the server to be invalid registration information; and
    setting, by the RPC core according to the second indication message, the valid registration information of the server stored in the dynamic service registry to be the invalid registration information.

5. The RPC method of claim 4, wherein setting the valid registration information of the server stored in the dynamic service registry to be the invalid registration information comprises deleting, by the RPC core, the valid registration information of the server.

6. The RPC method of claim 1, wherein registration information of the server comprises a correspondence between an identity of the server and a service handle, wherein the RPC request carries the identity of the server, wherein determining that the dynamic service registry stores the valid registration information of the server when the dynamic service registry stores valid registration information corresponding to the identity of the server carried in the RPC request, and wherein forwarding the RPC request to the server comprises:
    determining, by the RPC core in the valid registration information, a service handle corresponding to the identity of the server carried in the RPC request; and
    forwarding, by the RPC core, the RPC request to the server according to the service handle corresponding to the identity of the server.

7. The RPC method of claim 1, further comprising:
    sending, by the server, a response message to the RPC core, wherein the response message carries a service execution result;
    receiving, by the RPC core, the response message from the server;
    forwarding, by the RPC core, the response message to the client software; and receiving, by the client software, the response message from the RPC core.

8. The RPC method of claim 1, further comprising sending, by the client software, the RPC request to the RPC core.

9. A network device, comprising:
a hardware layer;
a virtual machine monitor (VMM) running at the hardware layer;
a virtual machine (VM) running on the VMM, wherein the hardware layer comprises a processor and a memory, a remote procedure call (RPC) core, a server, and client software running on the VM, and wherein the RPC core is configured to:
receive an RPC request from the client software, wherein the RPC request requests calling a service deployed on the server;
determine that a dynamic service registry stores valid registration information of the server, wherein the valid registration information comprises an identifier of a first status value, wherein invalid registration information comprises the identifier of a second status value, and wherein setting the valid registration information to be the invalid registration information comprises switching the identifier from the first status value to the second status value; and
forward the RPC request to the server according to the valid registration information when determining the dynamic service registry stores the valid registration information of the server, and wherein the server is configured to:
receive the RPC request from the RPC core; and
provide a corresponding service for the client software according to the RPC request.

10. The network device of claim 9, wherein the server is further configured to send a first indication message to the RPC core, wherein the first indication message instructs the RPC core to set the valid registration information of the server in the dynamic service registry, and wherein the RPC core is further configured to set the valid registration information of the server in the dynamic service registry according to the first indication message.

11. The network device of claim 10, wherein the RPC core is further configured to:
write registration information of the server to the dynamic service registry when the dynamic service registry does not store the registration information of the server, wherein the registration information is the valid registration information; and
update the registration information of the server when the dynamic service registry stores the registration information and the registration information is the invalid registration information, wherein the updated registration information is the valid registration information.

12. The network device of claim 9, wherein the server is further configured to send a second indication message to the RPC core, wherein the second indication message instructs setting the valid registration information of the server stored in the dynamic service registry to be invalid registration information, and wherein the RPC core is further configured to set, according to the second indication message, the valid registration information of the server stored in the dynamic service registry to be the invalid registration information.

13. The network device of claim 12, wherein the RPC core is further configured to delete the valid registration information of the server to set the valid registration information to be the invalid registration information.

14. The network device of claim 9, wherein registration information of the server comprises a correspondence between an identity of the server and a service handle, wherein the RPC request carries the identity of the server, wherein the dynamic service registry stores the valid registration information of the server when the dynamic service registry stores the valid registration information corresponding to the identity of the server carried in the RPC request, and wherein the RPC core is further configured to:
determine, in the valid registration information, a service handle corresponding to the identity of the server carried in the RPC request; and
forward the RPC request to the server according to the service handle corresponding to the identity of the server.

15. The network device of claim 9, wherein the server is further configured to send a response message to the RPC core, wherein the response message carries a service execution result, and wherein the RPC core is further configured to:
receive the response message from the server; and
forward the response message to the client software, and wherein the client software is further configured to receive the response message from the RPC core.

16. The network device of claim 9, wherein the client software is configured to send the RPC request to the RPC core.

17. A non-transitory computer-readable medium comprising computer-executable instructions that, when executed by a processor, causes a network device to:
receive an RPC request from client software, wherein the RPC request requests the RPC core to call a service deployed on a server, and wherein the network device comprises a virtual machine (VM), the RPC core, the server, and the client software;
determine, by the RPC core, that a dynamic service registry stores valid registration information of the server, wherein the valid registration information comprises an identifier of a first status value, wherein invalid registration information comprises the identifier of a second status value, and wherein setting the valid registration information to be the invalid registration information comprises switching the identifier from the first status value to the second status value;
forward, by the RPC core, the RPC request to the server according to the valid registration information when determining the dynamic service registry stores the valid registration information of the server;
receive, by the server, the RPC request from the RPC core; and
provide, by the server, a corresponding service for the client software according to the RPC request.

18. The non-transitory computer-readable medium of claim 17, wherein the computer-executable instructions further cause the network device to be configured to:
send, by the server, a first indication message to the RPC core, wherein the first indication message instructs the RPC core to set the valid registration information of the server in the dynamic service registry; and
set, by the RPC core, the valid registration information of the server in the dynamic service registry according to the first indication message.

19. The non-transitory computer-readable medium of claim 17, wherein the computer-executable instructions further cause the network device to be configured to:
write, by the RPC core, registration information of the server to the dynamic service registry when the dynamic service registry does not store the registration information of the server, wherein the registration information is the valid registration information; and updating, by the RPC core, the registration information when the dynamic service registry stores the registration information of the server and the registration information is invalid registration information, wherein the updated registration information is the valid registration information.

20. The non-transitory computer-readable medium of claim 17, wherein the computer-executable instructions further cause the network device to be configured to:

send, by the server, a second indication message to the RPC core, wherein the second indication message instructs the RPC core to set the valid registration information of the server to be invalid registration information; and set, by the RPC core according to the second indication message, the valid registration information of the server stored in the dynamic service registry to be the invalid registration information.

* * * * *